United States Patent [19]

Schexnayder

[11] 4,083,469
[45] Apr. 11, 1978

[54] BRAKE COOLING CIRCUIT

[75] Inventor: Lawrence Francis Schexnayder, Joliet, Ill.

[73] Assignee: Caterpillar Tractor Co., Peoria, Ill.

[21] Appl. No.: 778,273

[22] Filed: Mar. 16, 1977

[51] Int. Cl.² ............................................. F16D 65/853
[52] U.S. Cl. .................................. 214/82; 37/126 A; 188/264 P
[58] Field of Search ......... 214/82; 188/264 R, 264 D, 188/264 E, 264 P, 71.6; 37/124, 126, 129

[56] References Cited

U.S. PATENT DOCUMENTS

| | | | |
|---|---|---|---|
| 2,976,965 | 3/1961 | Schjolin | 188/264 P X |
| 3,730,301 | 5/1973 | Heck et al. | 188/264 P X |
| 3,949,844 | 4/1976 | Larson et al. | 188/264 P |

Primary Examiner—Albert J. Makay
Attorney, Agent, or Firm—Phillips, Moore, Weissenberger, Lempio & Majestic

[57] ABSTRACT

A brake cooling circuit which includes a pump for circulating cooling fluid to the brakes in a scraper portion of a tractor scraper combination is driven by a motor powered by hydraulic fluid communicated through conduits leading to one of the implements of the scraper. Selective actuation of the brake cooling circuit may be accomplished manually by the operator. Automatic actuation of the brake cooling circuit is also provided upon a signal of a high temperature condition in the brakes. The vehicle hydraulic circuit is designed to override the cooling circuit upon actuation of the implement by the operator. Upon completion of the work cycle of the implement, the cooling circuit is reactuated. The cooling circuit is comprised of the motor driving the pump and the fan, a radiator, conduits for communicating cooling fluid through the radiator and to the brakes, a control assembly, and a separate source of cooling fluid. In the control assembly, vehicle air pressure is used to operate a series of valves to divert a limited flow of pressurized hydraulic fluid from the implement circuit to run the motor.

13 Claims, 2 Drawing Figures

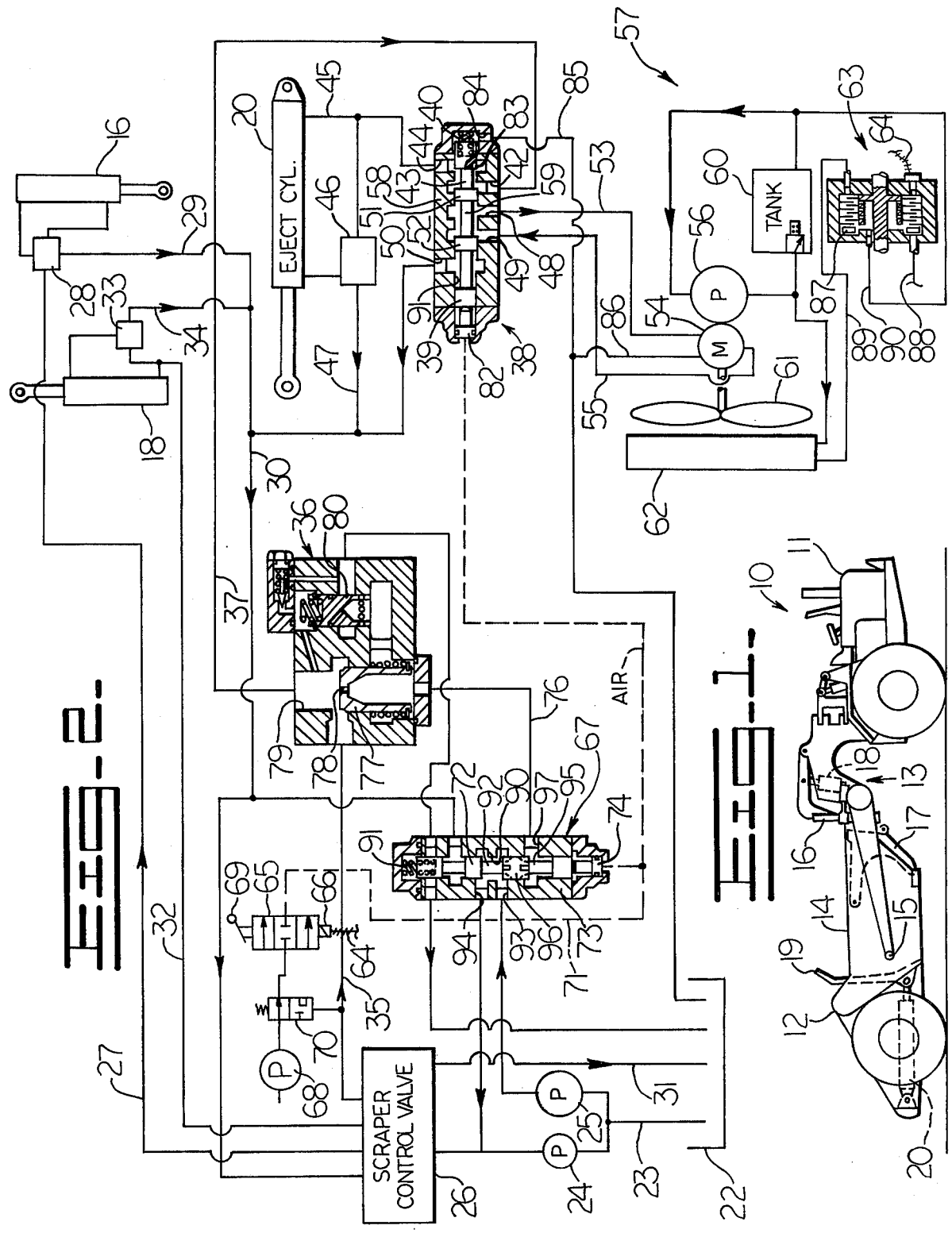

BRAKE COOLING CIRCUIT

BACKGROUND OF THE INVENTION

This invention relates to a hydraulically driven cooling circuit for vehicle brakes. In particular, it deals with a hydraulic cooling circuit in a tractor scraper combination wherein hydraulic fluid is provided from one of the implement circuits in the scraper.

In heavy construction equipment, particularly those pieces of heavy construction equipment which are load carrying, cooling of vehicle brakes may be a necessity. Air cooling is practical in smaller comstruction vehicles in light of the size of the brakes. In larger vehicles, which utilize interleaved discs, one disc associated with a fixed portion of the vehicle while the next adjacent disc is associated with a traction member, air cooling usually is not sufficient. Accordingly, fluid may be supplied to an axial bore in the wheel axle and then through radiating ports in the shaft directed toward the interleaved discs. The hot cooling fluid leaving the brakes may then be pumped through a radiator for cooling and then back to the brakes.

In some cooling circuits attempts have been made to utilize the hydraulic fluid utilized by the vehicle implements. Although this is satisfactory, it suffers from a drawback that foreign particles may be picked up from the brakes and communicated back through the hydraulic system affecting high pressure seals, valves and orifices in the various implement subsystems. This can prove detrimental to the operation of such implements. Utilizing brake fluid suffers from the same drawback in that the brake fluid may pick up foreign particles from the brake linings thus affecting brake seals. Similarly utilizing lubrication fluid suffers from a similar drawback. Installation of appropriate filters can, in part, solve the problem, however such filters have to be changed frequently. Accordingly, it is appropriate to provide a separate fluid circuit for cooling of vehicle brakes. Separate fluid can not only be filtered but may also be chosen for its heat transfer properties.

In tractor-scraper combinations wherein the scraper is affixed to the tractor by an articulated connection, it is advantageous to limit the number of pressurized fluid lines passing over the articulated connection. Therefore to pressurize cooling fluid in the tractor for communication to a cooling circuit in the scraper would add at least two more lines (a supply and return line) passing over the articulated connection. It is therefore appropriate to utilize available hydraulic pressure to operate such a cooling circuit in the vicinity of the brakes themselves.

The operator of the heavy construction vehicle should be provided with the capability of actuating the brakes irregardless of the brake temperature. Frequently the operator's attention is concentrated on other functions in an operator actuated cooling system therefore overheated brakes and possibly a costly failure may be the result. It is therefore appropriate to relieve the operator of the added burden of watching brake temperature and provide temperature sensing means at the scraper brakes in a tractor scraper combination in order to actuate the cooling circuit motor.

Finally, it would be appropriate to design the primary hydraulic circuit so that upon actuation of a work implement no degradation of the work implement occurs because the cooling circuit is actuated.

SUMMARY OF THE INVENTION

The present invention is directed to overcoming one or more of the problems as set forth above.

Broadly stated, the invention is a brake cooling circuit in a tractor scraper combination. The scraper is drawn by the tractor through an articulated connection and includes a bowl, the bowl having work elements each operable by double acting jacks. A source of pressurized fluid is available at the tractor along with control valves for operating each of the double acting jacks. Separate conduits supply and return fluid to one end of each jack and a single conduit supplies and returns fluid to the other opposite end of all the jacks. The brake cooling circuit which forms the combination comprises a fluid driven motor, a cooling fluid reservoir, a radiator and conduit means for inter-connecting the reservoir to the scraper brakes through the radiator. Pump means driven by the fluid driven motor circulates the cooling fluid through the conduit means. Pneumatic responsive means are provided for selectively diverting pressurized hydraulic fluid from the separate conduit for one of the work element jacks for operation of the fluid driven motor. A temperature sensitive pneumatic circuit responsive to brake temperature is provided to operate the pneumatic means when the scraper brakes are above a predetermined temperature.

BRIEF DESCRIPTION OF THE DRAWING

The purposes and objects of this invention will become apparent from the study of the following specification and accompanying drawing in which:

FIG. 1 is an elevation view of a tractor scraper combination in which this invention may be utilized. FIG. 2 is a schematic diagram of the brake cooling circuit shown relative to the vehicle hydraulic circuit.

DETAILED DESCRIPTION OF THE PREFERRED EMBODIMENT

A tractor scraper combination 10 of the type in which the brake cooling circuit described herein could be utilized is illustrated in FIG. 1. Characteristics of the tractor scraper combination 10 include a tractor 11 and a scraper 12. The tractor 11 draws the scraper 12 by means of an articulated connection 13. The scraper 12 includes a bowl 14 which may be elevated about a pivot point 15 by means of cylinders 16. Material carried in bowl 14 is retained therein by pivoted apron 17 which is actuated by an apron jack 18. An ejector 19 is movable reciprocally in bowl 14 by means of an ejector jack 20 to eject material carried in bowl 14. Control of the three primary implement actuators just described is accomplished by the operator riding in tractor 11 by means of conventional hydraulic circuits well known in the art.

It is appropriate in the design of tractor scraper combinations to reduce the number of pressurized hydraulic lines passing over articulated connection 13, therefore the conventional design of these hydraulic circuits generally shows a common return line or "common rail." Accordingly, this invention is described in the context of a common return or common rail type hydraulic system.

Referring now to FIG. 2, the control portions of this circuit located on the left side of the drawing are conventionally positioned on the tractor 11. In particular, the reservoir 22 provides a source of hydraulic fluid. Conduit means 23 inter-connects the reservoir 22 with a pair of parallel arranged pumps 24 and 25. Pump 24 feeds directly into a scraper control valve 26 operable by the operator to selectively communicate pressurized fluid from the tractor 11 to one or several of the work implements positioned on the scraper 12. In particular, a conduit 27 communicates with a bowl check and quick drop valve 28 and in turn with bowl cylinder jack 16 for actuation of the bowl 14 in the upward or downward mode. It is of course understood that the bowl 14 can drop by its own gravity thus the purpose of bowl check and quick drop valve 28 is to, in part, relieve hydraulic pressure in conduit 27 during transporting operations of the tractor and scraper combination. Fluid is communicated from bowl cylinder jacks 16 back through the bowl check and quick drop valve 28 through a conduit 29 to a common return or common rail 30 and thence back to scraper control valve 26 for return to reservoir 22 by means of a conduit 31.

Similarly, a conduit 32 communicates fluid selectively from scraper control valve 26 to an apron sequence valve 33 and in turn apron cylinder jack 18 for operation of apron 17. Fluid is communicated from the apron cylinder jack 18 and apron sequence valve 33 by means of a conduit 34 interconnected with common rail conduit 30.

A third main conduit 35 communicates with ejector cylinder jack 20 through a dump spool valve means such as dump spool valve arrangement 36 which would normally be positioned on the tractor 11. Fluid is then communicated through a conduit 37 to valve means on the scraper for communicating to ejector cylinder 20. Such valve means can be in the form of an unloading valve 38 which includes a valve spool 39 resiliently biased in a bore 41 in housing 58 by helical spring means 40 to a leftward position as shown in FIG. 2. This leftward position allows communication of hydraulic fluid from conduit 37 communicated to port 42 to pass a groove 43 formed on valve spool 39 and outwardly of an axially displaced port 44 to a branched conduit 45 communicating with ejector cylinder jack 20 and ejector speed change valve 46. Fluid is returned from ejector cylinder jack 20 by a conduit 47 which communicates with common return conduit 30.

Unloading valve 38 is formed with three additional axially separated ports 48, 49 and 50. Port 48 is adjacent to inlet port 42 and on the other opposite side of a land 51 formed on spool 39 adjacent a groove 59 while spool 39 is resiliently biased to the normal position as indicated in FIG. 2. Port 48 communicates with bore 41 as does port 49 between land 51 and a land 52 also formed on spool 39, with the spool in the aforedescribed normal position. Port 50 communicates with bore 41 on the other opposite side of land 52 with spool 39 in the position as shown in FIG. 2. Port 48 communicates with a conduit 53 to selectively provide pressurized hydraulic fluid to a hydraulic motor 54 of conventional design. Hydraulic fluid is returned from motor 54 to port 49 of unloading valve 38 by means of a conduit 55.

Motor 54 drives a pump 56 in the brake cooling circuit 57. Brake cooling circuit 57 includes a source of brake cooling fluid 60, a fan 61, a radiator 62 through which brake cooling fluid may be circulated and appropriate conduit means to communicate fluid from pump 56 through radiator 62 to the scraper brakes 63 for cooling thereof and return to tank 60 or pump 56.

The scraper brakes 63, shown schematically in FIG. 2 would, for example, be of the interleaved disc variety actuable by hydraulic pressure to bring the interleaved discs into contact one with another. Each disc is alternately affixed to either the vehicle wheel or the vehicle frame so that contact between interleaved discs will frictionally stop the vehicle wheel. Included in the vehicle brakes would be a heat sensing element 64 to actuate the cooling system when the scraper brakes reach a predetermined temperature.

Brake cooling circuit 57 may be actuated either manually by the operator or upon signal from brake sense means 64 through the use of a valve means such as valve 65. Valve 65 may be a three position two way valve operable manually to communicate air to unloading valve 38 and a diverter valve 67. Valve 65 is also operable by solenoid upon signal from sensing element 64 to communicate air to the same two valves. It is to be understood that valve 65 although described as a three position two way valve could be replaced by other valve structures which would accomplish the same purpose.

The tractor scraper combination is provided with a source of pneumatic pressure 68 which may be in the form of an engine driven pump and an accumulator system and which may serve other purposes in the tractor scraper combination. Air is communicated from the source of pneumatic pressure 68 through a pilot operated two position two way valve 70. Valve 70 is responsive to fluid pressure in conduit 35 which actuates ejector cylinder 20. Fluid pressure in conduit 35 acts as pilot fluid to close valve 70 to prevent communication of pneumatic pressure from the source of pneumatic pressure to the various valves actuable for communicating fluid pressure to motor 54 in circuit 57. The purpose of valve 70 is to provide the tractor scraper combination with the capability of ejecting a load from the bowl even though the brake cooling circuit has been actuated by the heat sensing element 64. It has been determined that the ejection of a load takes a brief period of time and further provides some degree of vehicle braking itself. Accordingly, this additional vehicle braking compensates at least in part for the brief loss of brake cooling occurring during load ejection.

Air communicated from valve 70 passes through valve 65 already described. Valve 65 is normally closed and as noted above is actuable either manually by the operator upon sensing an overheat condition or automatically by solenoid 66 upon signal from heat sensing element 64. Air pressure is communicated from valve 65 through an air line 71 to diverter valve 67. Diverter valve 67 is interposed in the hydraulic circuit between one of the two pumps, in this case pump 25 and the scraper control valve 26. Diverter valve 67 is comprised of a spool member 72 disposed in a bore 90 in a housing 73 and biased by resilient means 91 so that fluid pressure from pump 25 is communicated directly to scraper control valve 26. Spool 72 is formed with a groove 92 allowing communication of fluid from pump 25 through an inlet port 93 to an adjacent outlet port 94 leading to scraper control valve 26 with the spool in the biased first position. Spool 72 defines a second groove 95 separated by a land 96 from groove 92. The housing 73 defines an outlet port 97 leading to dump spool valve 36. With the spool urged to a second position fluid communicated to inlet port 93 is diverted from outlet port 94 to outlet port 97. Diverter valve 67 is responsive to pneumatic pressure communicated to a pilot chamber 74 from conduit 71. With pneumatic pressure communicated to pilot chamber 74, fluid pressure from pump 25 is diverted to dump spool valve 36 while simultaneously a drain passage from dump spool valve 36 is opened to reservoir 22. Similarly when air is communicated to pilot chamber 74, a passage in diverter valve 67 is opened from common rail 30 directly to reservoir 20.

Fluid is communicated from diverter valve 67 to a conduit 76 upon imposition of pneumatic pressure in pilot chamber 74. Conduit 76 communicates with dump spool valve 36 to urge upwardly a spool member 77 in dump spool valve 36. Spool member 77 is formed with an axial orifice 78 communicating with chamber 79 in dump spool valve 36. With spool member 77 urged upwardly by fluid pressure communicated in conduit 76, a passage in dump spool valve 36 interconnecting conduit 35 from scraper control valve 26 to conduit 37 is closed. Orifice 78 therefore controls fluid flow by dumping excess flow across dump spool 80. Maximum fluid pressure is also controlled by the conventional dump spool 80 positioned in the dump spool valve 36.

Simultaneously with pneumatic pressure communicated through chamber 74 of diverter valve 67, pneumatic pressure is communicated to a pilot chamber 82 formed in unloading valve 38 located in the scraper portion of the tractor scraper combination. Pneumatic pressure communicated to pilot chamber 82 urges spool 39 of unloading valve 38 rightwardly as viewed in FIG. 2 against the resilient bias of helical spring 40. Such rightward urging of spool 39 results in interconnection of inlet port 42 with outlet port 48 communicating with the motor 54. Thus motor 54 is actuated and cooling fluid is communicated through the cooling circuit 57 to cool brakes 63. Fluid is returned to unloading valve 38 through conduit 55 at port 49 which is opened to port 50. Fluid is then communicated through the common rail 30 back to the tractor of the tractor scraper combination. It should be noted the operator would not have selected an implement valve to actuate the apron or the bowl or the ejector. Accordingly, fluid must be relieved in common rail 30 since the normal return path through scraper control valve 26 may be blocked. This is done, as noted above, by the diverter valve 67 providing a passage from common rail 30 to reservoir 22.

Provision of fluid pressure at port 42 with spool 39 moved rightwardly as noted above, results in a certain amount of leakage around land 51 on spool 39. This minimal amount of leakage around spool 51 would normally cause a slow ejection of the load by pressurizing the head end of ejector cylinder 20 through conduit 45. Accordingly, spool 39 is provided with a vent slot 83 formed in the spool to communicate fluid pressure at groove 43 to an outlet port 84 formed in the housing of unloading valve 38. Outlet port 84 serves two purposes. First, to communicate fluid pressure through the slot 83 as noted and thus vent the head end of ejector cylinder 20, and secondly, to provide a vent port for the end of spool 39 opposite the pilot chamber 82 wherein the helical spring 40 is located. A drain line 85 communicates port 84 back to the tractor and tank 22. A similar drain line 86 communicates with motor 54 and interconnects with drain line 85 to return leakage fluid in motor 54 to the reservoir 22.

Although operation of the above-entitled brake cooling system should be apparent to one skilled in the art, a brief description of such operation is offered herewith. The brake cooling system 57 provides cooling fluid to brakes in a towed vehicle such as a scraper 14. Fluid to actuate the brakes is provided from the conventional vehicle braking system through a pressurized conduit 88 to move an annular cylinder 87 causing interleaved braking discs associated with the vehicle brake to come into frictional contact. Such frictional contact raises temperatures in the braking system 63. The cooling circuit provides cooling fluid through a conduit 89 which may be interconnected with an axial bore of the vehicle axle. Fluid is communicated outwardly from the axial bore to the interleaved discs and then communicated back to the brake cooling circuit through a conduit 90 which collects cooling fluid communicated outwardly of the braking discs. Fluid is circulated in the brake cooling system by means of a pump 56 through a radiator 62 for cooling of the fluid. The pump is operated by a hydraulic motor 54 which concurrently drives a fan 51 arranged to circulate air through radiator 62. The motor 54 is actuated either by a high temperature condition in the brake heat sensing element 64 which will actuate valve 65 located in the tractor portion of the articulated tractor scraper combination or manually by the vehicle operator. Actuation of valve 65 communicates air to a diverter valve 67 located in the tractor and the unloading valve 38 located in the scraper portion. Such air communicated to these two valves moves the valve spools of the two valves so that hydraulic fluid is communicated through the valve 67 and through a dump spool valve 36, which serves to control or limit fluid flow for the operation of the motor in the brake cooling circuit and, thence through the unloading valve 38 to the motor 54. It is particularly important to note that the dump spool valve serves the purpose of limiting fluid flow. Fluid communicated from one of the two pumps, either 24 or 25 would be excessive for operation of motor 54, however, the size of the fluid pumps is usually not determined by the motor 54 but rather by the implements associated with the scraper.

In addition to the high temperature sensing operation of the cooling circuit just described, the operator is provided with means such as lever 69 for operating valve 65 manually in the event a high temperature is sensed in the brake cooling circuit and the high temperature sensing device is inoperative.

Finally, the air circuit is provided with an override valve 70 so that an ejection cycle may take place during brake cooling without degrading the ejector circuit.

The override valve 70 is a pilot operated valve sensitive to hydraulic pressure communicated to the ejector circuit. Valve 70, when actuated, bleeds the air side of the circuit to return the diverter valve 67, the dump spool valve 36 and the unloading valve 39 to the position shown in FIG. 2 to allow the ejector cylinder to be operated normally. Upon completion of the ejector cycle, the valve 70 again provides the pressure to the circuit and reactivates the cooling circuit.

Although this invention has been described in relation to a particular embodiment in a tractor scraper combination and in relation to the one work implement, it is to be understood that variations may be incorporated herein without departing from the spirit of the invention. The invention is to be considered as limited only by the attached claims.

The embodiments of the invention in which an exclusive property or privilege is claimed are defined as follows:

1. In a tractor and towed vehicle, the towed vehicle drawn by the tractor through an articulated connection, the tractor including a source of pressurized fluid, the towed vehicle including wheel brakes and at least one work implement actuable from the tractor; the work implement operable by a jack for adjusting said work implement, the jack operable independently by a control valve on the tractor, separate conduit means for supply and return of fluid from the control valve to each end of said jack, a brake cooling circuit comprising:
- a fluid driven motor;
- a cooling fluid reservoir;
- a radiator;
- conduit means for interconnecting said reservoir to the towed vehicle brakes through said radiator;
- pump means driven by the fluid driven motor for circulating cooling fluid through the conduit means;
- diverter means for selectively diverting pressurized hydraulic fluid from one of the separate conduit means for the one work implement jack for operation of said fluid driven motor; and
- temperature sensitive means responsive to brake temperature for operating said diverter means while said brakes are above a predetermined temperature.

2. The combination set forth in claim 1 further comprising fan means driven by the fluid driven motor for circulating ambient air about the exterior of the radiator.

3. The combination set forth in claim 2 wherein the termperature sensitive means further comprises manually operable means for actuating the temperature sensitive means.

4. The combination set forth in claim 3 wherein the temperature sensitive means comprises:
- a source of pressurized air;
- temperature sensing means for determining temperature of the towed vehicle wheel brakes; and
- a normally closed valve responsive to an increase in brake temperature to communicate pressurized air to the diverter means.

5. The combination of claim 4 wherein the diverter means comprises:
- dump spool valve means for selectively communicating limited fluid flow to one of the separate conduit means supplying fluid to one end of the one work implement jack;
- first valve means responsive to air pressure communicated from the temperature sensitive means for diverting a portion of the pressurized fluid to the dump spool valve means;
- second valve means interposed in said one of the separate conduit means between said dump spool valve means and said one work implement jack and responsive to air pressure communicated from the temperature sensitive means for diverting the limited flow of pressurized fluid from said one of the separate conduit means to operate the fluid driven motor; and 6. The combination of claim 5 wherein the motor conduit means further comprises a supply conduit and a return conduit communicating fluid to and from the fluid driven motor respectively.

7. The combination of claim 5 wherein the one work implement comprises ejector means for ejecting a load of material.

8. The combination of claim 5 wherein the source of fluid pressure comprises a fluid reservoir, a supply of hydraulic fluid contained in said reservoir, and more than one hydraulic pump in parallel arrangement for pressurizing said fluid.

9. The combination of claim 6 wherein the first valve means comprises:
- a housing defining a bore;
- a valve spool resiliently biased in a first position in said bore;
- said housing further defining a first inlet port communicating with the source of pressurized fluid and first and second outlet ports positioned adjacent said first inlet port on either side thereof, said first outlet port communicating with the control valves and said second outlet port communicating with the dump spool valve means, said housing further defining a pilot chamber at one end of said axial bore, said pilot chamber communicating with the temperature sensitive means for selectively urging said valve spool to a second position;
- said valve spool defining a first groove, a second groove and a land separating said first and second grooves, said first groove allowing communication between said first inlet port and said first outlet port and said land blocking communication between said first inlet port and said second outlet port with said valve spool in a first position and said second groove allowing communication between said first inlet port and said second outlet port with said spool in said second position, said land blocking said first outlet port with said spool in said second position.

10. The combination of claim 9, wherein said second valve means comprises;
- a second valve housing defining a second valve bore;
- a second valve spool resiliently biased to a first position in said second bore;
- said second valve housing defining a first inlet port communicating with the one of the separate conduit means for supply of fluid from the dump spool valve means to the one end of the work implement jack, a first outlet port communicating with the one work implement jack and a second outlet port communicating with the supply conduit;
- said second valve spool defining a first and a second groove and a land separating said first and said second grooves, said first groove of said second valve spool allowing communication between said first inlet port and said first outlet port and said land blocking communication between said first inlet port and said second outlet port with said valve spool biased to said first position, and said second groove allowing communication between the first inlet port and the second outlet port and said land blocking said communication between said first inlet port and said first outlet port with said valve spool urged to a second position by pressurized air communicated to said second valve means from the temperature sensitive means.

11. The combination of claim 10, wherein the first and second outlet ports defined in the second valve housing are adjacent to and on opposite sides of the first inlet port; and further wherein said second valve housing defines a drain port adjacent the first outlet port and further wherein the second valve spool defines drain groove means, said drain groove means for communicating said first outlet port with said drain port while said second valve spool is urged to the second position.

12. The combination of claim 11 wherein said second valve housing defines a second inlet port adjacent the second outlet port and communicating with the return conduit and a third outlet port adjacent the second inlet port and communicating with the other of the separate conduit means and further wherein said second valve spool defines a second land allowing communication only between said second inlet port and said third outlet port with said second valve spool urged to the second position.

13. The combination of claim 12, wherein the other of the separate conduit means communicates return fluid to the control valve and further wherein the source of fluid pressure includes a fluid reservoir and wherein the first valve means further comprises passage means for selectively communicating fluid pressure from the other of the separate conduit means to the fluid reservoir with the valve spool in the second position.

* * * * *